Oct. 10, 1944.     G. KEINATH     2,359,767
INTEGRATING MEASURING SYSTEM
Filed July 23, 1942     3 Sheets-Sheet 1
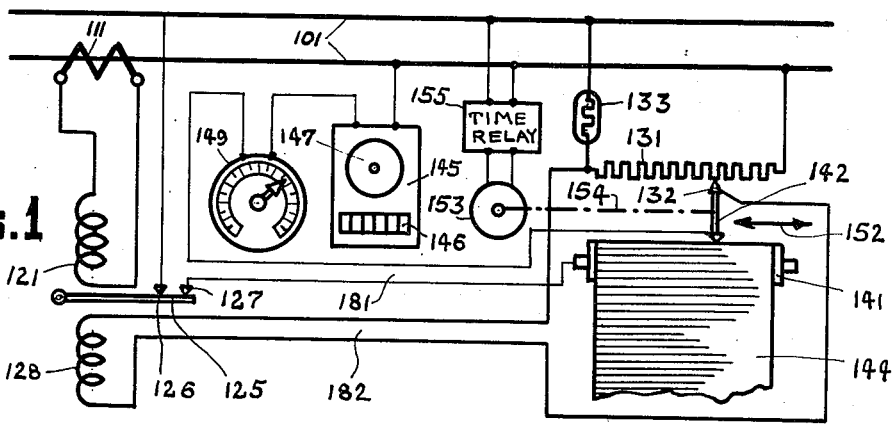
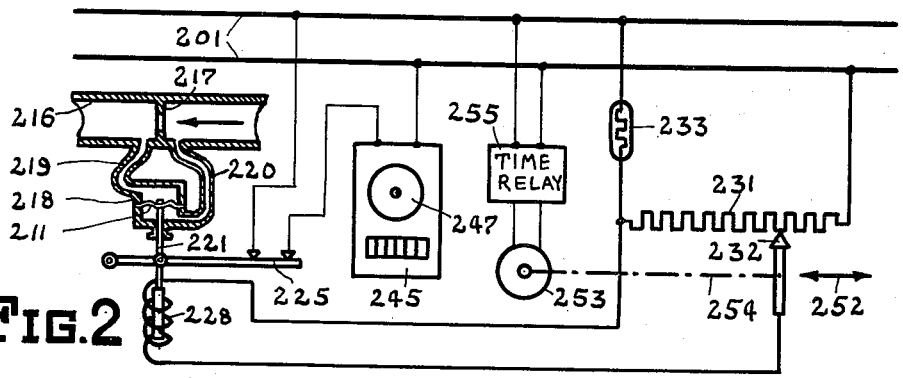
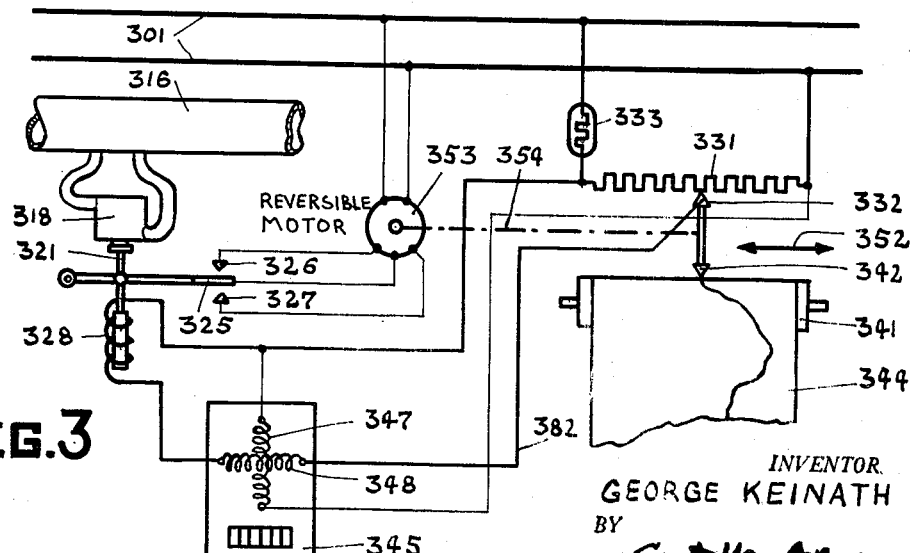
INVENTOR.
GEORGE KEINATH
BY Oct. 10, 1944.　　　G. KEINATH　　　2,359,767
INTEGRATING MEASURING SYSTEM
Filed July 23, 1942　　3 Sheets-Sheet 2

INVENTOR.
GEORGE KEINATH
BY

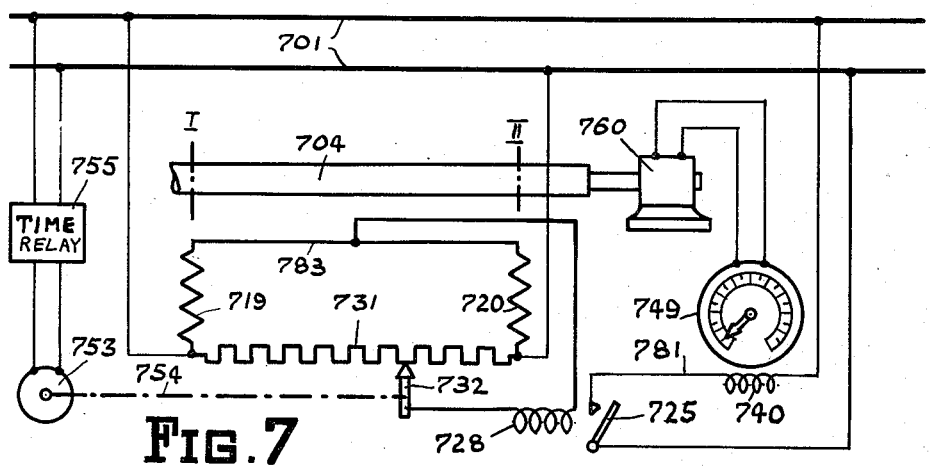
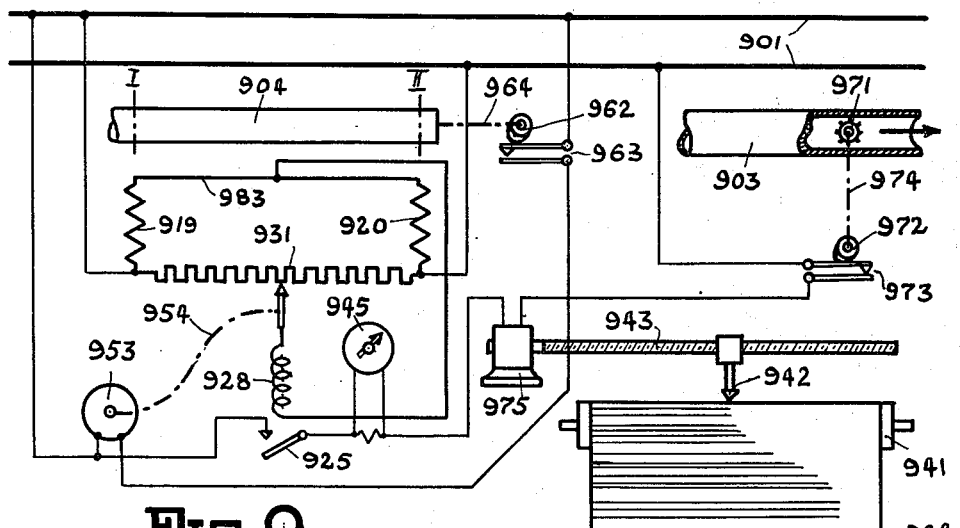
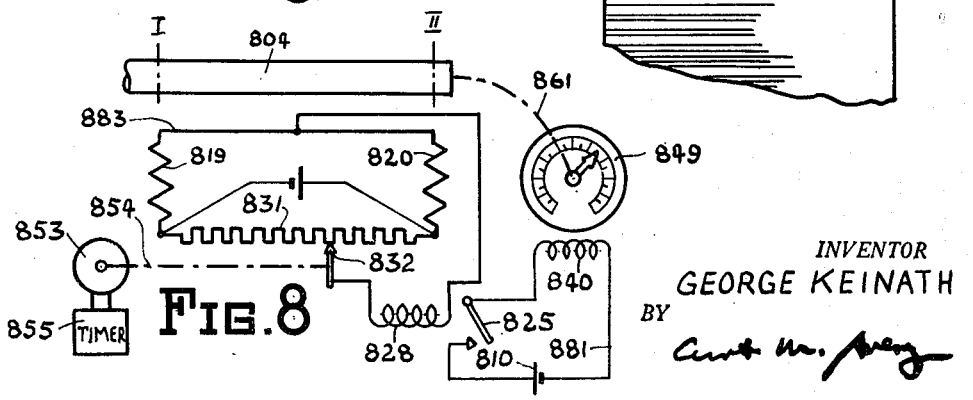

Patented Oct. 10, 1944

2,359,767

UNITED STATES PATENT OFFICE 2,359,767

INTEGRATING MEASURING SYSTEM

George Keinath, Larchmont, N. Y.

Application July 23, 1942, Serial No. 452,023

21 Claims. (Cl. 73—432)

My invention relates to electrical systems for measuring, indicating, recording, or control purposes, and more particularly to electrical apparatus in which a movable member, such as a pointer, recording device, or control element, operates in dependence upon, and in a given relation to, the changes of a variable physical magnitude, for instance voltage, current, wattage, speed, pressure, temperature, flow quantity, efficiency, etc.

The invention, as regards some of its modifications and features, is related to the inventions disclosed in my copending applications, Serial No. 402,170, filed July 12, 1941; Serial No. 384,489, filed March 21, 1941; and Serial No. 440,373, filed April 24, 1942, but is independently and fully disclosed hereinafter.

An object of the present invention is to provide electric systems of the above-mentioned type which are especially advantageous when the measuring operation is to involve an integrating or multiplying function as is the case in systems for measuring, for instance, flow quantities of fluids, heat quantities, power or fuel consumptions, efficiencies and the like integrated or otherwise compounded magnitudes.

One of the more specific objects, subordinate to the foregoing, is the provision of an electric system for indicating or recording the rate or quantity of flow in fluid conduits while effecting the measurement proper by other and more reliable, better manageable and modifiable means than the fly ball devices heretofore known for such purposes.

An object is also to provide improved measuring means for determining heat quantities, for instance the heat supplied to a consuming apparatus in the form of heated fluid.

Still another object is to afford an improved metering of mechanical energy magnitudes occurring in machines and apparatus whose operation to be observed is non-electrical, as is the case when measuring the power output of driving plants on ships or aircraft having a power generator directly coupled with the power-consuming propeller. The devices available for measuring magnitudes of mechanical energy are rather complicated and, for many purposes, unsatisfactory as to accuracy or operating speed. These deficiencies are intended to be eliminated or lessened by the present invention.

A further object, relating to indicating, recording and control apparatus in general, involves the provision of systems of high measuring accuracy in which a movable member, to be controlled in accordance with a physical control magnitude, is power-operated while very simple means are employed to obtain such an operation, as compared with known devices for similar purposes.

It is also an object of my invention to render measuring systems of the above-mentioned types capable of obeying a variety of linear or non-linear laws of transmission as regards the dependency of the effected operation upon the primary magnitude controlling the operation. That is, while satisfying one or more of the objects mentioned in preceding paragraphs, an aim of the invention is also to have the ultimate measuring or control result of the system represent a given mathematical relation to the variable control magnitude so that the indicated or recorded data are, for instance, proportional to the square root, square, third or fourth power of the control magnitude.

Another object consists in the provision of a measuring system of such basic construction and operation as to lend itself readily to a variety of different types of primary control magnitudes, so that substantially the same apparatus may be used for measuring, or acting in dependence upon, elecrical, thermal or mechanical magnitudes.

It is further an object of my invention to provide measuring systems which produce a measuring result as a function of two or more variable control effects, i. e. which perform a calculating operation in order to form the ratio, product or other mathematical relation between the control magnitudes. For instance, it is within the last-mentioned object to provide a system for determining a mechanical work magnitude as a product of a measured torque and a separately-measured speed of revolution of an energy-transmitting shaft, or for determining an efficiency value as a function of H. P.-hours and fuel supply, for instance.

These and other objects will be apparent from the following description of the essential features of the invention and from the discussion of the embodiments presented thereafter.

My invention consists in a measuring system in which a variable physical control magnitude is translated into a correspondingly varying period of time. This period is determined with the aid of a scanning operation of controlled speed and operating simultaneously with the scanning. More specifically, my invention involves a measuring arrangement containing a relay and a variable balancing means, in which the control magnitude is continually compensated by the balancing means as to the effect on the relay, so that when during the scanning operation the moment of balance is reached, the relay responds and thereby controls the operation of the integrating instrument. In a preferred embodiment of such an arrangement, a potentiometric device is used and its movable member is so driven as to effect the necessary scanning by varying the potentiometric output voltage over a given range. In such a device, the time point of response of the relay is determined by the phase position of the movable potentiometer member at which the effect of the output voltage on the relay has a given ratio to that of the control magnitude.

In one aspect of my invention, both the scanning or potentiometric operation and the integrating operation are proportional to time so that the instrument acts like a clockwork whose running period is controlled and varied in dependence upon the control magnitude.

In another aspect, the invention provides that at least one of the just-mentioned operations occur at a variable speed controlled by another control magnitude, so that the integral result shown by the instrument is a function of two variables.

It is also an essential feature of one line of systems according to the invention that the above-mentioned scanning or potentiometric variation be cyclical and completed within a given period of time so that the integrating measuring device operates only during a portion of the cyclical period, this portion being variable and determined by the control magnitude.

A further characteristic of some systems within my invention is the provision, in an arrangement of one of the basic types already mentioned, of additional control means such as contactors which superpose on the control of either the potientiometric scanning device, or the integrating measuring instrument, or both, an additional control effect subject to the variations of a second or third control magnitude, with the result that the ultimately measured value is a function of two or three control magnitudes. This permits determining such compound integrals as, for instance, efficiency or heat consumption values.

In order to explain more fully the above-mentioned and other features of my invention, reference is made to the drawings showing several measuring systems designed and operating in accordance with the foregoing.

Fig. 1 shows the circuit diagram of an integrating measuring system for determining an electric magnitude, in particular for electric currents.

Fig. 2 is a diagrammatic illustration of an integrating metering device for measuring flow quantities of fluids such as the consumption of steam or gas.

Fig. 3 shows the circuit diagram of another embodiment also for metering flow quantities of fluids.

Figs. 5 through 9 refer to systems for measuring mechanical energy magnitudes. More specifically, Fig. 5 exemplifies a torque or deflection-measuring control device applicable in the system of Figs. 6 through 9.

Figure 6:
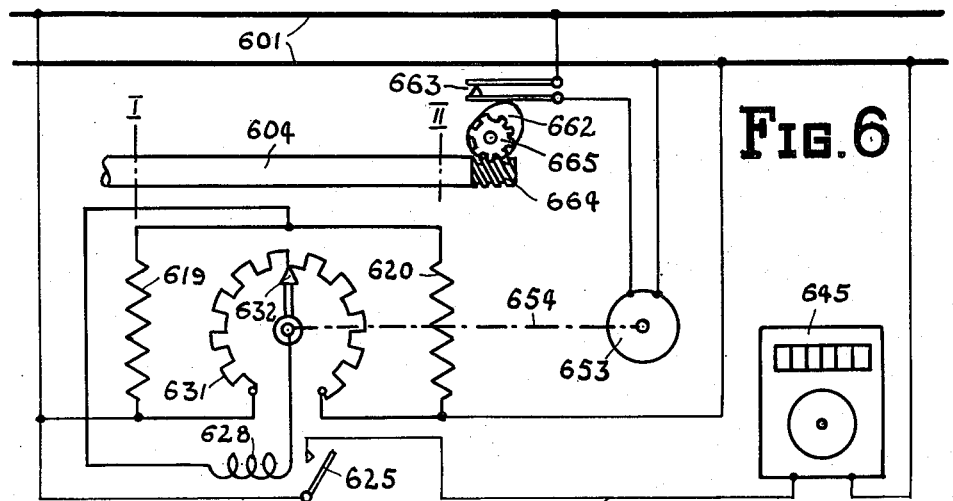

Fig. 6 is the diagram of a system for determining work magnitudes measured, for instance, in H. P.-hours.

Figs. 7 and 8 illustrate systems for metering mechanical power magnitudes, for instance in H. P.

Fig. 9 represents the circuit diagram of a system for measuring a ratio of two magnitudes such as the efficiency of a machine plant expressed, for instance, in H. P.-hr. per unit of fuel consumption.

In order to facilitate comparing the figures with one another and also in the interest of brevity and clarity of the following description, the last two digits of the reference numerals used in the different figures are identical when referring to identical or functionally similar elements.

Referring to Fig. 1, the illustrated current-measuring system is energized from the A. C. line 101 and contains a current transformer 111 as the primary control element. A differential relay with a movable armature 125 and two actuating coils 121 and 128 has its coil 121 connected with the current transformer 111 so that the coil is energized in accordance with the current in line 101. A potentiometric voltage source is provided for the excitation of the second relay coil 128. This voltage source consists in the embodiment of a potentiometer resistor 132 energized by constant voltage from the line 101 over a voltage-stabilizing regulating resistor or lamp 133. A movable contact 132 and one of the terminals of resistor 131 are connected to the relay coil 128. Consequently, the energization of coil 128 depends on the position of contact 132 relative to resistor 131.

The two relay coils 121 and 128 act in opposition to each other so that the movable element 125 performs a control movement when the two opposing torques, caused by the coils, balance each other. This balance condition can be obtained by placing the contact 132 in a position where the output voltage of the potentiometer has such a value as to compensate the control effect on the relay caused by the transformer 111. Hence, the position of the potentiometer contact 132, in which the relay is balanced, is indicative of the magnitude of the current measured by transformer 111.

When responding to the balance condition, the relay armature opens or closes its contacts 126 and 127, and thereby controls a circuit 181 whose purpose will be discussed in a later place.

The movable potentiometer contact 132 is connected with a drive motor 153 by a mechanical transmission represented by the dot-and-dash line 154. The motor runs in proportion to time and consists in the example of a synchronous motor fed from the line 101. The connection 154 is so designed that the contact 132 reciprocates over a given range. As a result, the bucking voltage supplied from the potentiometer to the relay coil 128 varies in a given cycle.

The control circuit 181 connected with the relay contacts 126 and 127 is energized from the line 101, unless some other current source such as a D. C. source or a condenser circuit is preferred. This control circuit contains three instruments, namely a recorder 141, an integrating counting device 145 and an indicator 149. These three instruments are so arranged as to operate simultaneously as long as the circuit 181 is closed by the relay.

The recorder 141 has a transport cylinder cooperating with a stylus 142 which moves in synchronism with the potentiometer contact 132. This synchronism is obtained by connecting the contact 132 directly with the stylus 142. The stylus 142 and the recorder cylinder form two electrodes with a recording tape 144 passing through the electrode gap. When the control circuit 181 is energized, the current across the electrode gap affects the paper tape 144 and produces thereon a mark. When using electrolytic recording tape, the mark consists of a line extending over that portion of travel of the stylus electrode during which the circuit 181 is closed by the relay. Thus in each cycle of operation a line is recorded whose length is coextensive with the distance between one end of the path of travel of the potentiometer contact 132 and the intermediate position at which the contact 132 passes through the above-mentioned balance adjustment. Hence, the length of each line traced on the recording tape is indicative of the current magnitude acting on transformer 111. In a series of consecutive cycles of operation, a number of parallel lines is marked down on the tape 144, thus producing, as illustrated, a record showing the current variations over any desired length of time.

The counting device 145 contains an integrating counting mechanism 146, for instance as used in various kinds of metering, counting or calculating devices, and actuating means for operating the counting mechanism in synchronism with the drive motor 153. In the embodiment illustrated, the actuating means of the counter consist of a synchronous motor 147 fed from the line 101, i. e. from the same A. C. source as the motor 153. This ensures the desired synchronism irrespective of frequency variations in the line 101. The operation of the counting device 145 begins and ends within each cycle of voltage variations simultaneously with the above-described operation of the recorder. As a result, the integral value counted by device 145 within each cycle of operation is also a measure of the current magnitude acting on transformer 111. However, the counting device accumulates the measuring results obtained in successive cycles of operation. Assuming a constant frequency of the line current, the integration effected by the counting device 145 measures ampere hours. If the line voltage is constant, the measuring result represents kilowatt hours. The counter may be calibrated to indicate directly the desired denomination.

The indicator 149 is a simple clockwork mechanism operated by a synchronous motor. At the end of each operating cycle, the pointer of the indicator shows the magnitude of the current then measured. After the completion of the cycle, the pointer returns to zero, or it maintains its position which is then corrected if the value counted in the next cycle departs from that previously indicated. Such indicator mechanisms are known as such, for instance, in chronometric tachometers, and are not part of the invention proper. When in operation, the indication effected by the indicator is in accordance with the current intensity prevailing in transformer 111 at the moment of balance. Hence, the indicator scale may be calibrated in ampere values.

The cycle of operation, i. e. the complete potentionmetric variation effected by the drive motor 153, may have any convenient duration. For instance, when working with a current of 60 cycles per second, an operating cycle of about 10 seconds' duration may be used to advantage. The arrangement of the potentiometric resistor 132, which for the sake of convenience is shown as requiring a reciprocatory motion of its contact, may have a circular shape (similar to the potentiometer shown in Fig. 6) so that the potentiometric bucking voltage increases in each cycle from a minimum or zero up to the maximum voltage.

The same system or one of its integrating measuring instruments operates as a maximum demand meter if the instrument is so designed as to extend the integrating operation over a plurality but definitely limited number of cycles. For instance, when using an indicator 149 which advances its pointer continually in successive cycles up to a total number of, say, 90 cycles, each of 20 seconds' total duration (total integrating time=30 minutes), the integral value obtained at the end of the period is a measure of the desired maximum demand. Any such grouping of the short cycles into long periods of a given duration of, for instance, 15, 30 or 60 minutes, leads to a similar result. It is obvious that the indication thus effected may be automatically recorded or that a recorder similar to 141 may be designed to group its parallel lines into groups of a given multiple number in order to obtain the just-mentioned result.

A system of the above-described type is especially advantageous in cases where the controlling energy to be measured is of very low magnitude. It will be seen that despite the simplicity of the measuring means, the indicating and recording instruments are accurately operated by drives of relatively great power. For instance, the indicator 149 may be of giant size for use as a wall instrument in power plants or the like, and does not require rotating neon tubes or the like apparatus.

The system for measuring flow quantities of fluids, illustrated in Fig. 2, is, in principle, largely similar to the one described in the foregoing. According to Fig. 2, a manometric device 218 is employed for providing a control magnitude in dependence upon the flow of steam, for instance, through a pipe 216 containing an orifice plate 217 which produces different pressures at both sides of the plate. Connections 219 and 220 cause the different pressures to act oppositely on a membrane 211. The deflection of the membrane depends on the pressure difference, and represents a measure of the rate of flow through pipe 216.

The membrane 211 is connected with a movable relay contact 225 by a rod 221. The contact is provided with an armature of soft iron acted upon by a solenoid 228. Hence, the relay responds to the differential effect caused by the two component effects of membrane 211 and solenoid 228, and, as long as the effect of the membrane exceeds that of the solenoid, causes the contact 225 to close a control circuit 281 fed from the line 201 and connected to the synchronous drive 247 of an integrating counting device 245.

The solenoid 228 is energized from a potentiometer whose resistor 231 is connected to line 201 over a voltage stabilizer 233. The movable contact 232 is periodically operated as is indicated by the arrow 252, so as to vary the output voltage in proportion to time over a given cycle of variations. This can be effected by means of a synchronous motor (not illustrated) also connected to line 201.

When the system is in operation, the torque exerted by the solenoid 228 on the relay member 225 increases periodically from a minimum to a maximum, and passes through a value where the torque imposed on the relay by the manometric drive is balanced. When the flow of steam in pipe 216 varies, the phase position of the balance point relative to the cycle of voltage variation is shifted accordingly. Hence, this phase position is representative of the flow magnitude to be measured. The counter 245 is energized during a portion of each cycle determined by the time which the movable potentiometer contact needs for traveling from the beginning of the cycle to the just-mentioned phase position (or from that position to the end of the cycle). Consequently, the operating period of the counter within each cycle depends on the flow magnitude to be determined, and thus the integral value counted is a measure of this flow magnitude.

The differential pressure measured by the pressure gauge 218 is proportional to the square of the rate of low in pipe 216. It is, as a rule, desired to use a meter calibrated directly in rate-of-flow magnitudes and using a linear scale or adding mechanism for this purpose. This is achieved in the system of Fig. 2 by providing a non-linear law of transmission between the controlling pressure gauge and the counting instrument. To this end, the following means are applied.

The connection 221 between the membrane 211 and the relay member 225 is so designed that the action (torque) produced on member 225 is linear. For instance, when using a mechanical connection as illustrated, the torque imposed on member 225 by the pressure gauge is straight-proportional to the pressure. On the other hand, the action of the solenoid 228 on the relay member 225 is non-linear. That is, when using an unsaturated iron core to transmit energy from the solenoid to the relay member 225, the torque produced is proportional to the square of the current energizing the solenoid. The variation of the potentiometric voltage progresses in linear proportion to time and so does the counting operation of the counter 245. In the moment of balance, the linear action (torque) caused by the quadratically progressing control gauge 228 is equal to the quadratic action of the linearly energized coil 228. As a result, the operation of the system involves the extraction of a square root. That is, the recurring operating periods of the counter and, accordingly, the integrals counted are proportional to the square root of the pressure measured by gauge 218. As a result, the counted values are straight-proportional to the rate of flow to be determined, and the counter may be calibrated directly in rate-of-flow values. (This provision of a non-linear law of transmission in measuring systems of the general type here involved is more fully described in my above-mentioned application Serial No. 440,373.)

The just-mentioned way of providing a non-linear transmission in order to extract square roots is also involved in the system of Fig. 3, showing another embodiment for metering flow quantities of fluids. The fluid passes through a conduit 316 provided with a pressure gauge 318 designed and operating in the same way as that described in connection with Fig. 2. The pressure gauge 318 is connected with the movable member of a differential relay 325 which is also subjected to an opposing torque produced by a solenoid 328 energized from a potentiometric voltage source 331 connected with the line 301 through a voltage stabilizer 333. The movable member 332 of the potentiometer is connected by a transmission 354 with a reversible drive motor 353. This drive motor is fed from the line 301 and has its field windings connected with the movable relay member 325 and with the relay contacts 326 and 327 cooperating with the member 325. When the relay member 325 is in the intermediate, neutral position, motor 353 remains at rest. When member 325 engages contact 326, the motor runs in one direction, and when member 325 engages contact 327, the motor 353 runs in the opposite direction. Similarly, the potentiometer contact 332 is stationary or moves in one or the other direction, depending upon the position of the relay member 325.

An integrating counting device 345 with a wattmetric drive motor has its voltage coil 347 connected with a constant voltage source. In the example, the potentiometer resistor 331 is used as such a source and has its terminals connected to those of the voltage coil 347. The current coil 348 of the wattmetric drive is series-connected with the relay solenoid 328 and arranged in the output circuit 382 of the potentiometer.

341 is the transport cylinder of an ink recorder for indicating the measured rate-of-flow values on a recording tape 344. The ink stylus 342 is moved in synchronism with the potentiometer contact 332. To this end, contact 332 and stylus 342 are mechanically connected with each other. While the recording tape 344 moves over the cylinder 341, the stylus writes a curve in accordance with the movements of the contact 332 and hence in accordance with the operation of the relay member 325.

In contrast to the measuring systems of the preceding embodiments, the control of the counter 345 by the control relay occurs indirectly in dependence upon the operation of the relay-controlled adjustment of the potentiometer. When contact 332 is in its zero position, the current in coil 348 is zero and the counting mechanism is at rest. When the contact 332 moves towards the voltage maximum position, the current in coil 348 increases accordingly so that the counter is operated with a speed of corresponding magnitude.

The operation of the flow-metering system is as follows. Let us assume that no fluid is delivered, that the contact 332 is in its zero position at the left-hand terminal of the resistor 331. Now, the counter 345 is inoperative for lack of current in coil 348. When a fluid flow in pipe 316 occurs, the relay member 325 is moved upwardly and engages contact 326. This causes the motor 353 to move the contact 332 towards the right-hand terminal of resistor 331. As a result, the solenoid 328 is energized in an increasing degree and the counter 345 operated by the increasing current traversing the coil 348. When the balance condition of the relay is reached, the relay member 325 assumes the neutral position and stops the motor 353. Now, the contact 332 is in a position indicative of the rate of fluid flow. This rate is recorded on tape 344. As long as the flow rate is unchanged, the contact 332 remains stationary. However, the counter coil 348 continues to be energized and integrates the measured flow value over the time of its persistence with an operating speed proportional to this value. When, now, the rate of flow decreases, the torque of coil 328 outweighs that of the pressure gauge, the relay member 325 turns downwardly and by engaging contact 327 causes the motor 353 to move contact 332 in the backward direction until the latter assumes the new balance position. This change of position is recorded on tape 344. At the same time, the current in coil 348 is reduced so that the counting operation proceeds at a lower speed.

It will be seen from the foregoing that in a system as represented by Fig. 3, the operation of the integrating instruments is not cyclic but extends over the entire period of the flow to be metered and that the metering is effected not by varying the duration of recurring counting intervals but by a controlled variation of the counting speed. The resulting integral value, however, is again indicative of the flow quantity to be determined.

The measuring operation involves the extraction of the square root as explained in the previous example, so that the recorder and counter may be given a linear calibration in flow quantity values, for instance tons of steam.

Figure 4:
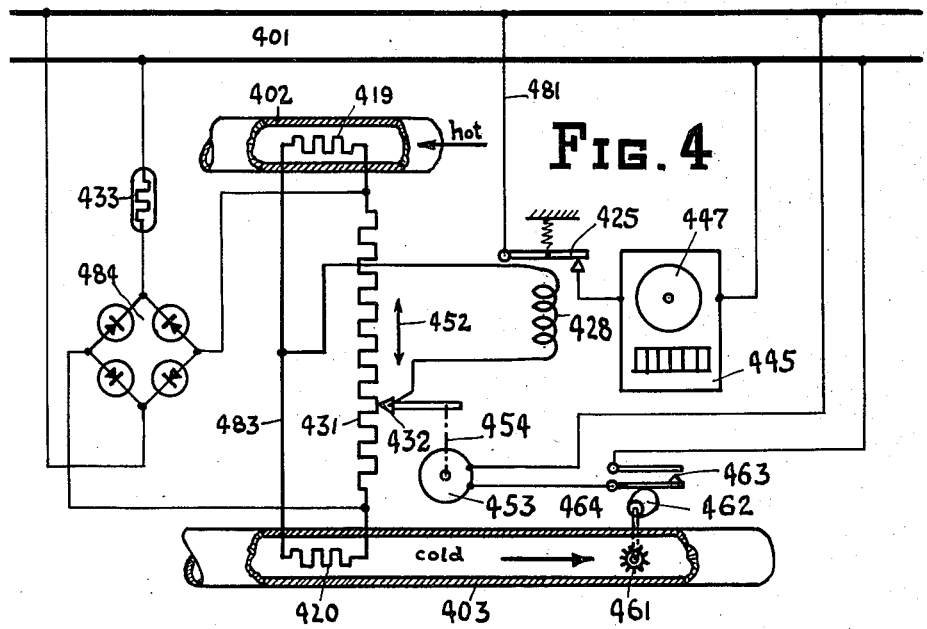
Fig. 4 shows diagrammatically a system for measuring heat quantities, in particular heat supplied by a flowing medium, like water, in a conduit and consumed between two spaced points of the conduit.

The measuring system shown in Fig. 4 serves for determining the quantity of heat consumed between two measuring points of a conduit system containing a fluid heat carrier such as water. The inlet conduit is denoted by 402 and the outlet conduit by 403. The heated water passes through conduit 402 in the direction of the arrow and leaves conduit 403 in the opposite direction, also indicated by an arrow, after having given off part of its heat contents in the heat-consuming appliance (not shown) connected between the two conduits. When in operation, the temperatures in the two conduits are different, the loss of temperature being dependent on the heat consumption to be measured. It is the purpose of the system to determine this temperature difference and to integrate the measured value over the duration of the heat supply in order to meter the heat quantity.

To this end, each of the two conduits 402 and 403 is provided with an electric temperature-responsive control element 419 and 420 respectively. These elements may consist of thermoelements, i. e. temperature-responsive voltage sources, or of temperature-responsive impedances. In the illustration, the elements are exemplified by thermo-responsive resistors.

The two resistors 419 and 420 are connected in a balanceable measuring circuit 483 fed from a constant voltage source 484 and containing a potentiometer resistor 431. The zero branch of the measuring circuit is connected to the movable contact 432 of the potentiometer and contains the actuating coil 428 of a polarized control relay whose movable relay member controls the circuit 481 of an integrating counting device 445. The drive motor 447 of the counting device is fed from the A. C. line 401 and, when energized, operates the counter in proportion to time.

Another synchronous motor 453, also fed from the line 401, is connected with the movable potentiometer contact 432 by a transmission 454 so as to reciprocate or otherwise actuate the contact by a cyclical motion. This causes the voltage in the zero branch of the measuring circuit to pass periodically through the zero adjustment. Consequently, the relay coil 428 is periodically energized in the following cycle. When the potentiometer contact 432 is next to one of the terminals of its path, the zero branch passes a current through coil 428 in a direction unsuitable to attract the relay member 425. Hence, the control circuit 481 is now opened and the counter 445 at rest. While the potentiometer contact travels towards the other end of its path, it reaches a phase position where the component control effects of the two resistors 419 and 420 are balanced so that the current in the zero branch is zero. When travelling beyond this point, a current of opposite direction appears in the zero branch. This causes the coil 428 to actuate the relay member 425. The control circuit 481 is closed and the counter 445 operated. The counting operation continues at uniform speed until the potentiometer contact reaches the end of its travel. Then a new cycle is started and the procedure repeated, or, depending upon the chosen design, the potentiometer contact returns into the original position keeping the counter operative until the balance point is passed during the return movement. In both cases, the duration of each operating period of the counter depends on the phase position of the potentiometer contact relative to its cycle of motion. Since, in turn, the phase position is dependent upon the resultant differential control effect produced by the two control resistors 419 and 420, the integral value counted during each period is a measure of the temperature difference between the two reference points, i. e. locations of the control resistors.

Interposed between the synchronous motor 453 and the line 401 is a contactor 463 actuated by a cam 462. This cam is connected with a metering mechanism 461 associated with the conduit 403 and of the type usually employed for metering the flow of water. Due to the control effected by this contact apparatus, the drive motor 453 is excited only when a flow of water occurs. Hence, the measuring system, including the counter 445, remains at rest when the heating system is not operated. When supplying water, however, the contactor 463 is periodically closed and opened by the cam 462, the frequency of these contact operations depending upon the rate of flow. That is, the drive motor 453 is started each time a given quantity of water has passed through the conduit. The contact apparatus is so designed that at the highest expected rate of water flow and, accordingly, at the highest frequency of operation of the contactor 463, the individual contact closure periods are at least equal to, or preferably longer than, the duration of a complete cycle of the potentiometric variation effected by the contact 432. For instance, if the cycle of the potentiometer is chosen with 10 seconds, the contact periods of the contactor 463 at the maximum rate of flow should be more than 10 seconds and recur in intervals of, say, 15 seconds. Then, the motor 453 is started in intervals of 15 seconds only when the maximum amount of water is passed through the conduits, each time for an operation of 10 seconds' duration. Under the same conditions, when only 5% of the maximum flow quantity prevails, an interval of 20·15=300 seconds occurs between subsequent startings of the motor, each individual operation and counting period lasting again 10 seconds.

Reviewed in its completeness, the integrating operation effected by the counting device depends on two controlling factors, the temperature difference and the rate of flow. Hence, the value counted is the result of the multiplication of these two factors and proportional to the heat quantity consumed between the reference points.

An essential feature of the system is the fact that the integrating synchronous counting device is operated during individual periods which are proportional to a variable control magnitude, and that these counting operations occur in variable intervals depending, as to the variable frequency of their occurrence, on another variable control magnitude, in particular a rate-of-flow value. It will be understood from the variety of examples already described and will also be apparent from the embodiments referred to hereinafter that this principle of integration in dependence upon two variable magnitudes is not limited to the measuring of heat quantities but also applicable to other measuring purposes without substantial changes of the measuring and control circuits of the network. Some other systems embodying the above principle and showing also some modifications and variants in other respects will be explained in connection with Figs. 5 through 9.

The measuring systems represented by Figs. 6 through 9 serve for determining magnitudes of mechanical energy transmission. The examples chosen relate to the transmission of energy by means of a revolving shaft, for instance the propeller shaft of a vessel or aircraft. One of the control magnitudes effective in the measuring systems is determined by means of a gauge measuring the torque of the shaft. This can be done by using a hydraulic pressure gauge or by determining the angular deflection between two spaced points along the shaft. Any of the available torque-measuring gauges is applicable in connection with the invention. One of these available means is used in each of the systems shown in Figs. 6 through 9 and therefore illustrated in Fig. 5 separately and more in detail.

Figure 5:
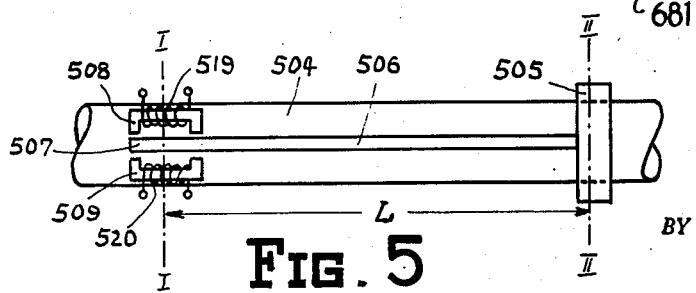

The device shown in Fig. 5 contains a revolving energy-transmitting element 504 consisting either of the engine or transmission shaft itself or of an elastic member inserted in the transmission. The dot-and-dash lines marked I and II indicate two spaced cross sections, the relative angular deflection of which is to be measured. A ring 505 firmly attached to the shaft at cross section I carries a rigid holder 506 with a magnetic armature 507 at its free end near cross section II. Two magnet cores 508 and 509 are firmly mounted on the shaft 504 so as to form two air gaps with the armature 507. Inductance coils 519 and 520 are provided on cores 508 and 509 respectively. When the shaft is at rest or runs idle, no deflection occurs between cross sections I and II and the inductance ratio of coils 519 and 520 has a given value, for instance 1:1. When transmitting energy, a deflection occurs with the result of moving the armature 507 towards one of the cores. One of the air gaps increases and the other decreases. The inductance of one coil increases and that of the other decreases accordingly. The change of the inductance ratio can be measured, for instance, by an electric bridge network, and represents a measure of the angular deflection. Since the elasticity and dimensions of the shaft are known and constant, the deflection thus determined is proportional to the torque.

While numerous other methods of measuring deflection and torque magnitudes are known, the foregoing example suffices for understanding the following description of the systems in Figs. 6 through 9.

The system shown in Fig. 6 affords measuring magnitudes of work, for instance in H. P.-hours. 604 is the energy-transmitting shaft and 619, 620 the two coils for measuring the torque, in accordance with the coils 519 and 520 explained in connection with Fig. 5. The coils 619 and 620 are arranged in opposite branches of a bridge network 683 whose balancing element consists of a potentiometer resistor 631. The appertaining slide contact 632 is connected in the zero branch of the bridge in series with the actuating coil 628 of a relay. The bridge is energized from a current source 510 shown as a D. C. battery, although any other type of current source may be chosen. The movable relay member 625, controlled by coil 628, lies in a control circuit 681 containing a counter 6445 and connected with a current source 601. Counter 645 operates in proportion to time. Hence, if source 601 is an A. C. line of sufficiently stable frequency, counter 645 may be driven by a synchronous motor. Otherwise a suitable mechanical or electrical clockwork may be used, the circuit 681 serving in the latter case to release and stop the clockwork or to control its coupling with the counting mechanism proper. Hence, the system lends itself readily to being adapted to any current supply conditions available on a vessel, vehicle or aircraft.

The movable contact 632 of the potentiometric balancing device is actuated by a synchronous or other uniform-speed motor 653, the driving connection being indicated by 654, so that the potentiometric output voltage in the zero branch varies in linear proportion to time. The motor 653 is controlled by a series-arranged contactor 663 which, in turn, is operated by a cam 662 driven by a gearing 664, 665 operated by the revolving shaft 604. The transmission ratio of the gearing is such that a contact is made after a given number of revolutions, lasting each time a given period of sufficient duration for permitting the motor 654 to perform a complete cycle of operation. For instance, a number of 100 revolutions may be chosen to effect one closure of the contactor. At a normal speed of 400 revolutions per minute, the closures would then occur in intervals of 15 seconds. At only 10% of the normal speed, the intervals between the closure-starting movements would be 150 seconds. The working conditions are thus similar to those of the above-explained system of Fig. 4. That is, the counter 445 measures a product of two factors supplied by the measuring circuit and the speed-controlled contactor respectively. The following consideration will show that this product is proportional to the magnitude of work done by the transmitted energy.

Work (W) is defined as $W = P \cdot t$ (P=power in H. P.; $t$=time). $P = T \cdot n/\text{min}$. (T=torque; $n/\text{min}$.=number of revolutions per minute). Since the torque is proportional to the angular deflection $\alpha$:

$P(\text{in H. P.}) = c \cdot \alpha \cdot n/\text{min} \cdot (c = \text{constant})$ and $W = c \cdot \alpha \cdot n$ Hence, the work done is proportional to the product of the deflection ($\alpha$) and the total number of revolutions. Since, further, the operating period, and therewith the integral value counted by the counter within each cycle of operation, is proportional to $\alpha$, the work done (W) is also defined by the counter operating period of the counter multiplied by the total number of revolutions. This product is in fact measured by the counter, so that the latter may be directly calibrated in work values, for instance H. P.-hours.

Fig. 7 exemplifies a system for measuring power values (rate of working), for instance in H. P., or mkg./sec. (meter-kilograms per second). 704 is a revolving shaft or the like element, and 719 and 720 are the two control elements comparable with parts 504, 519 and 520 respectively in Fig. 5.

The coils 719 and 720 are connected in a bridge circuit 783 whose zero branch feeds a relay coil 728 and is connected to the slide contact 732 of a potentiometer resistor 731. The contact is driven by a motor 753 with the aid of a suitable transmission as denoted by 754. The relay coil controls a relay contact 725 which closes and opens a control circuit 781 fed from a current source 710 and serving to control an integrating counter 749. 701 denotes a current source for driving the motor 753 at a uniform speed, i. e. in proportion to time.

As far as described, the system of Fig. 7 is similar to the preceding example and hence needs no further explanation as to design and operation. However, the following features depart from the previous embodiments. The motor 753 is controlled by a timing device or timing relay 755 so as to operate intermittently in equal intervals. For instance, the motor may be started in intervals of 15 seconds so as to operate each time for a period sufficient to complete a cycle of potentiometric voltage variations. The counter is energized by a voltage supplied from a generator 760 which is coupled with shaft 704 so that its frequency, and hence the synchronous speed of the counter, is proportional to the speed of revolution, i. e. to the number ($n$) of revolutions per unit of time. The counter 749 is controlled by coil 781 which actuates a coupling for connecting and disconnecting the counting mechanism proper from its motoric drive.

Due to the particular means just described, the system operates in this manner: As soon as the timer 755 energizes the motor and causes it to start a cycle of voltage variations, the relay coil 725 is suitably energized and by closing contact 725 starts the counter 749 to run in proportion to the speed of the shaft 704. Along its path of travel, the potentiometer contact 732 passes through the balance point and thereby causes the relay to open the control circuit 781, thereby stopping the counter mechanism although the drive of the latter continues running. The counter mechanism remains at rest for the remaining duration of the cycle. After 15 seconds from the starting moment, the operation repeats itself. The counting mechanism is of a type which causes the indicating pointer to resume the zero position after each operation or to correct the previous position in accordance with the result of the subsequent count.

The value measured by the counter in each operating cycle depends on two controlling factors, on the torque measured by the bridge 783 and on the speed of the shaft. The product thus measured is proportional to the H. P.-value to be determined, as will be seen from the formula—

$$\text{H. P.} = \text{torque} \cdot \frac{n}{\min.} \left( = \alpha \cdot \frac{n}{\min.} \right)$$

Reverting now to Fig. 4, it will be seen from a comparison with Fig. 7 that a heat-measuring system affording results similar to that obtained with the system of Fig. 4 does not necessarily require the use of a synchronous-clock type counting device mentioned in connection with the above-described heat quantity meter. For instance, the counter mechanism in a system otherwise similar to that of Fig. 4 may be directly driven by a water meter, such as meter 461, so that the counting speed is proportional to the flow quantity of the heat-carrying agent (water). If then the coupling between the driving water meter and the counting mechanism is controlled by the relay in response to the temperature difference measured by the bridge circuit 483, the counted value is also indicative of the heat quantity to be determined for reasons akin to those explained in connection with the similar arrangement shown in Fig. 7.

In order to further demonstrate the versatility of systems according to the invention, reference is made to Fig. 8 showing a H. P. measuring apparatus operating in accordance with that of Fig. 7 but designed especially for a largely mechanical operation of the driving means employed.

The shaft 804 in Fig. 8 is directly coupled by a mechanical transmission 861, such as a flexible shaft, with the counter 849. This is equivalent, as to function, to the electrical means 760 of Fig. 7. The motor 853 and its timer 855 may be mechanical, for instance operated by a hand-wound clockwork. The bridge circuit 883, containing the control elements 819 and 820 and the potentiometer resistor 831, is fed from a battery 810 which may be identical with the current source of the control circuit 881 connecting the relay member 825 with the coupling 840 of the counter. If the control elements 819 and 820 consist of thermoelements, the voltage source 810 is superfluous, and the connection between the relay and the counter coupling may also consist of a mechanical transmission. Consequently, the system may be designed as a portable apparatus or is especially suitable for use on vessels or in other places where current sources of stable frequency are not easily available.

Fig. 9. exemplifies a measuring system according to the invention, in which an integrating measuring operation is controlled by three control magnitudes. The system illustrated serves for determining the efficiency of a mechanical energy transmission measured by H. P.-hours per unit of fuel consumption. A measuring circuit 983, containing two torque-responsive control elements 919 and 920 and a potentiometric balancing resistor 931 whose movable contact 932 is operated by a synchronous motor 953 fed from the line 901, serves to control the coil 928 of a relay so as to transform the torque of a transmission shaft 904 into a corresponding length of time to be indicated by a time-integrating counting instrument. The instrument used in this example is a recorder having a paper transport cylinder 941 for moving a recording tape 944 and recording thereon lines of time-indicating length by means of a stylus electrode 942 which is displaced by the rotation of a worm shaft 943 actuated by a synchronous motor 975. The latter is fed from the line 901 and controlled by the movable relay member 925.

The drive motor 953 of the potentiometer is under the control of a contactor 963. This contactor is operated by a cam gear 962 or the like connected by a transmission 964 with the shaft 904 so as to energize the motor 953 in intervals depending on the speed of revolution ($n$/min.) of the shaft. This motor control is similar to that of Fig. 6 and hence will be understood from the foregoing explanation relating to Fig. 6.

The instrument motor 953, aside from being controlled by the torque-responsive relay arrangement, is also controlled by a contactor 973 actuated by a mechanism 972 and transmission 974 from a metering device 971 measuring the rate of flow in a fuel supply conduit 903.

The operating speeds of the two motors 953 and 975 are proportional to time. Motor 953 completes each cycle of voltage variations and each recording step simultaneously within a given length of time, for instance 10 seconds. At the completion of each cycle, the potentiometer contact returns into the zero position. This is effected either by an idle return movement or by using a circular construction as shown in Fig. 6. The recorder stylus 942 remains in the position reached at the end of a voltage cycle and continues progressing over a multitude of cycles before it is returned to zero. This will be explained presently.

The contactor 663 and its drive are so calibrated that the highest operating frequency occurring at the maximum speed of revolution suffices to ensure the completion of the scanning and recording operation in the intervals between contact closures. Hence, the shortest interval of contactor operation in the chosen example must last for at least 10 seconds and may, for instance, be chosen with 15 seconds. The cycle of operation of the contactor 973 must include a multiple of the cycles of contactor 963 at the highest expected power input. For instance, a ratio of 100:1 is sufficient for ensuring a satisfactory determination of the average value of the efficiency to be determined. Thus a period of 100·15=1500 seconds, or ½ hour at maximum power input would be appropriate for the operation of the contactor 973. This period would increase to 1 hour if the power input (fuel supply) is reduced to half the rated maximum value. The paper feed effected by the recorder cylinder 941 is proportional to time.

When in operation, the portion of the system controlled by the measuring relay circuit and the speed-responsive contactor 663 measures the H. P.-hours, while the control superposed by contactor 973 determines the total duration of each group of integrating operations in dependence upon the fuel supply Consequently, the result obtained is indicative of the relation of H. P.-hours to fuel quantity and hence of the efficiency magnitude of interest.

The indication effected on tape 944 is composed of lines. In contrast to the operation of the recorder described above with reference to Fig. 1, however, each line is composed of a multitude (at least 100) line portions, each portion representing the integral taken over a single potentiometric cycle (10 seconds) and each complete line representing the total integral taken over the entire measuring period as determined by contactor 973. Each completed line indicates an efficiency value. At the end of the entire period, the recorder stylus returns idle to zero. An electric connection (not illustrated) with the contactor 973 can be used, for instance, to control the return movement. The distance between the lines varies in accordance with the load of the energy transmission, i. e the smaller the load, the longer the intervals between the closure operations of the contactor 973 and hence the wider the distances between the recorded lines. Instead of the recorder or in addition thereto, an integrating counter 945 may be connected with the control circuit so as to show the integral value reached at the end of each completed cycle of contactor 972. The counting proceeds proportionately to time. After the end of each period of contactor 973, the counter is reset to zero or its previous indications corrected.

I claim:

1. An electric measuring system, comprising in combination a control relay, measuring means responsive to a variable physical magnitude and connected with said relay to supply a component control effect, variable energizing means also connected with said relay for supplying another component control effect so that said relay responds to a resultant differential control effect caused by said two component effects, drive means connected with said energizing means so as to vary said other component effect cyclically over a given range, a counting device and means for actuating said counting device in synchronism with said drive means, said actuating means being controlled by said relay to be operated in dependence upon said resultant control effect reaching a predetermined magnitude, so that said counting device is effective within an operating cycle of said drive means during a period indicative of said variable physical magnitude.

2. An electric measuring system, comprising in combination a control relay, control means subject to a variable physical control magnitude and connected with said relay to produce a component control effect corresponding to said magnitude, variable energizing means also connected with said relay for producing another component control effect so that said relay responds to a resultant differential control effect caused by said two component effects, drive means connected with said energizing means for varying its component control effect over a given range, an integrating counting device and actuating means for operating said counting device, means controlled by said relay and connected with said actuating means for energizing the latter so as to operate said counting device during periods depending upon said variable control magnitude so that the integrated value shown by said counting device is indicative of said magnitude.

3. An electric system for measuring a variable physical magnitude, comprising a differential relay having two actuating members, control means connected with one of said members for producing a component effect on said relay in accordance with said magnitude, variable bucking means connected with said other member for producing a component effect on said relay in opposition to said first component effect so as to have said relay respond to a given ratio of said two component effects, drive means connected with said bucking means for varying its component effect over a given range including the response condition of said relay, an integrating counting device and actuating means for operating said counting device, and energizing means controlled by said relay and connected with said actuating means for controlling the latter so as to operate said counting device during periods depending on said magnitude.

4. An electric system for measuring a variable physical magnitude, comprising a control relay, control means responsive to said magnitude and connected with said relay for supplying a component control effect in accordance with said magnitude, electric circuit means also connected with said relay so as to superpose another component control effect in order to have said relay respond to a resultant differential effect of a given value, said circuit means containing a variable member for changing said latter component effect over a given range including the response condition of said relay, an integrating counting device and actuating means for operating said counting device, and energizing means controlled by said relay and connected with said actuating means for controlling the latter so as to operate said counting device during periods depending on said magnitude.

5. An electric system for measuring a variable physical magnitude, comprising a control relay, control means responsive to said magnitude and connected with said relay for producing a control effect in accordance with said magnitude, variable energizing means also connected with said relay for producing another control effect so that said relay responds to a given resultant differential control condition caused by said control effects, drive means connected with said energizing means so as to vary said other effect over a given cycle of variation, an integrating measuring device and means for actuating said device in synchronism with said drive means, said actuating means being controlled by said relay to operate in dependence upon said relay responding to said resultant condiiton, whereby the integrations effected by said device during its operating periods are indicative of said magnitude.

6. An electric measuring system for effecting a control operation in dependence upon a variable physical mangitude, comprising main control means for producing a control effect in accordance with said magnitude, variable auxiliary control means for producing a comparative control effect, measuring means connected with said main control means and said auxiliary control means for comparing said two effects with each other, said measuring means including a relay disposed so as to respond to a balance condition between said two effects, drive means connected with said auxiliary control means for varying its control effect over a given range in order to establish said balance condition at a point of travel indicative of said magnitude, and an integrating measuring device controlled by said measuring means so as to perform its integrating operation in accordance with said point of travel.

7. An electric system for measuring a variable physical magnitude, comprising control means for producing a control effect in accordance with said magnitude, cyclically variable control means for producing another control effect, balancing means connected with both said control means for comparing said two effects with each other and having a relay arranged to respond to the occurrence of a balance condition between said effects, drive means connected with said cyclically variable control means for varying its control effect over a range including said balance condition, and an integrating measuring device having actuating means synchronous with said drive means and connected with said relay to be controlled by the latter so that the operating speed of said measuring device depends on that of said cyclical variation and the operating period of said device within each cycle is dependent on the occurrence of said balance condition, whereby the integral measured by said device is a function to be determined of said magnitude.

8. An electric system for measuring a variable physical magnitude, comprising a relay, control means responsive to said magnitude and connected with said relay to produce a control effect in accordance with said magnitude, electric circuit means also connected with said relay for producing another control effect so that said relay responds to the balance condition of said two effects, said circuit means including a variable potentiometric member, drive means connected with said potentiometric member to change the control effect of said circuit means over a given range in order to establish said balance condition at a point of travel indicative of said magnitude, an integrating measuring device, and circuit means for energizing said device, said energizing means being controlled by said relay to effect an integration in dependence upon said point of travel, whereby said indication represents a function of said physical magnitude.

9. An electric system for measuring a variable physical magnitude, comprising a relay, control means responsive to said magnitude and connected with said relay to produce a control effect in accordance with said magnitude, electric circuit means also connected with said relay for producing another control effect so that said relay responds to the balance condition of said two effects, said circuit means including a potentiometer having a movable member for varying the effective potentiometer voltage, cyclically operating drive means connected with said movable member to vary said voltage cyclically over a given range in order to establish said balance condition at a phase position indicative of said magnitude, an integrating measuring device and actuating means for operating said device in synchronism with said drive means, said actuating means being connected with said relay to be controlled thereby, whereby said measuring device effects an integrating operation during a portion, of the cycle of said voltage variation, determined by said phase position so that the integral measured represents a function of said magnitude.

10. An electric system for measuring a variable physical magnitude, comprising a differential relay having a movable contact and two actuating members for imposing opposite effects on said contact so as to cause a control movement of the latter when the ratio of said effects passes through balance, control means responsive to said magnitude and connected with one of said actuating members to vary its effect in dependence upon said magnitude, a source of a cyclically varying voltage connected with said other actuating member for varying its effect cyclically over a given range, an integrating counting device and actuating means for operating said device in synchronism with said cyclically varying voltage, said actuating means being connected with said contact so as to be controlled thereby, whereby said counting device is operated within the time of a voltage cycle for a period depending upon said magnitude.

11. An electric system for determining a measuring value as a non-linear function of a variable physical magnitude, comprising an electric relay arrangement having a movable element and differential control means for actuating said movable element, said differential control means containing an electrically operated actuating member and a second actuating member arranged to act on said movable element in opposition to each other, one of said members having a linear and the other a non-linear action, control means responsive to said magnitude connected with said second member for energizing it in dependence upon said magnitude, an energizing circuit connected with said first actuating member, a potentiometer disposed in said circuit, means for controlling said potentiometer so as to vary the energizing voltage of said circuit in accordance with a linear law of progression, an integrating counting device and actuating means for operating said device at a linear rate of progression, and means controlled by said movable relay element and connected with said actuating means so as to operate said counting device in dependence upon the occurrence of balance between said linear and non-linear actions, whereby the value of the integral indicated by said counting device represents the non-linear function to be determined 12. An electric system for determining a measuring value as a non-linear function of a variable physical magnitude, comprising an electric relay arrangement having a movable element and differential control means for actuating said movable element, said differential control means containing an electrically operated actuating member and a second actuating member arranged to act on said movable element in opposition to each other, one of said members having a linear and the other a non-linear action, control means responsive to said magnitude connected with said second member for energizing it in dependence upon said magnitude, an energizing circuit connected with said first actuating member, a potentiometer disposed in said circuit, means for controlling said potentiometer so as to vary the energizing voltage of said circuit in accordance with a linear law of progression, an integrating counting device and actuating means for operating said device in synchronism with said voltage variation, said actuating means being connected with said movable relay element to be controlled thereby in order to operate said counting device for a period depending upon said variable voltage passing through a voltage value at which said linear and non-linear actions are balanced, whereby the value of the integral indicated by said counting device represents the non-linear function to be determined.

13. An electric system for determining a differential magnitude of two comparable physical conditions, comprising two control elements responsive to said conditions respectively, a measuring network connected with said two elements and containing a relay and variable circuit means for varying the proportional effects of said control elements on said relay, said relay having circuit control means responsive to the passage through a given ratio of said proportional effects, drive means connected with said circuit means for varying the electrical characteristic of the latter over a given range to establish said ratio at a phase position indicative of said magnitude, a counting device having actuating means for operating said device in synchronism with said drive means, and a control circuit connecting said actuating means with said circuit control means to operate said counting device during a period determined by said phase position.

14. An electric system for determining a differential magnitude of two comparable physical conditions, comprising two control elements responsive to said conditions respectively, a measuring network connected with said two elements and containing a relay and variable circuit means for varying the proportional effects of said control elements on said relay, said relay having circuit control means responsive to the passage through a given ratio of said proportional effects, drive means connected with said circuit means so as to vary the electrical characteristic of said circuit means over a given cycle of variations in order to establish said ratio within each cycle at a phase position of said variation indicative of said magnitude, a counting device having actuating means for operating said device in synchronism with said drive means, a control circuit connecting said actuating means with said circuit control means to operate said counting device within each cycle for a period determined by said phase position, and a control device connected with said drive means for limiting its operation at a time to a given consecutive number of said cycles.

15. An electric system for measuring a variable physical magnitude, comprising control means for producing a control effect in accordance with said magnitude, cyclically variable control means for producing another control effect, balancing means connected with both said control means for comparing said two effects with each other and having a relay arranged to respond to the occurrence of a balanced condition between said effects, drive means connected with said cyclically variable control means for varying its control effect over a range including said balance condition, and an integrating measuring device having actuating means synchronous with said drive means and connected with said relay to be controlled by the latter so that the operating speed of said measuring device depends on that of said cyclical variation and the operating period of said device within each cycle is dependent on the occurrence of said balance condition, and a control device connected with said drive means for limiting its operation at a time to a given consecutive number of said cycles.

16. Electric apparatus for measuring the consumption of heat in a heat-supplying system, comprising two temperature-responsive control elements disposed in said system and spaced from each other with respect to the flow direction of the heat supply, a balanceable measuring network connected with said two elements and containing a relay and variable circuit means for balancing the effects of said elements on said relay, said relay having circuit control means responsive to the balance condition, a motor connected with said circuit means for varying the electrical characteristic of the latter cyclically over a given range to repeatedly establish said balance condition at phase positions respectively indicative of the temperature difference of said elements, an integrating counter having actuating means operating in synchronism with said motor and connected with said circuit control means so that said counter is operative during periods determined by said phase position within each cycle, whereby the integrated value shown by said counting device is a measure of the heat quantity consumed between said control elements.

17. In a heat-measuring means as set forth in claim 16, said heat supply system being formed of a conduit system containing a flowing fluid as a heat-carrying agent, a fluid quantity meter disposed in said conduit system, and a contact device associated with said meter and connected with the aforesaid motor to energize it in dependence upon the flow of fluid through said conduit system.

18. A system for measuring a mechanical energy magnitude, comprising a structure to be subjected to mechanical energy, in combination with two electric control elements disposed relatively to said structure so as to respond differently to an effect of said energy, a balanceable measuring network connected with said two elements and containing a relay and variable circuit means for balancing the effects of said elements on said relay, said relay having circuit control means responsive to the balance condition, a motor connected with said circuit means for varying the electrical characteristic of the latter cyclically over a given range to repeatedly establish said balance condition at phase positions respectively indicative of the temperature difference of said elements, an integrating counter having actuating means operating in synchronism with said motor and connected with said circuit control means so that said counter is operative during periods determined by said phase position within each cycle, whereby the integrated value shown by said counting device is a measure of said magnitude.

19. A system for measuring a mechanical energy magnitude of a revolving structure, comprising an electric measuring arrangement comprising two control elements disposed relatively to said structure to respond differently to the effect of said energy, a relay and adjustable potentiometric circuit means connected with said control elements so as to permit balancing the effect of said elements on said relay by varying said potentiometric means, a drive connected with said potentiometric means for varying its adjustment independently of said magnitude over a given adjusting cycle, and an integrating counter having actuating means for operating it in synchronism with said potentiometric variation, said actuating means being connected with said relay to be controlled thereby in order to operate said counter during periods determined by the occurrence of balance within said cycle, and circuit control means connected with said measuring arrangement for controlling the duration of a series of consecutive cycles in accordance with another magnitude.

20. A system for measuring a ratio of a mechanical energy magnitude and another magnitude, comprising electric control means subjected to said mechanical energy magnitude, a balanceable measuring network having a relay and adjustable potentiometric circuit means connected with said control means so as to permit balancing the effect of said control means on said relay with the aid of said potentiometric means, a periodically operating drive for varying the adjustment of said potentiometric means independently of said magnitudes over a given cycle, an integrating counter having actuating means for operating it in synchronism with said drive, said actuating means being connected with said relay to be controlled thereby in order to operate said counter within each of said cycles during a period determined by the time point of the occurrence of balance, control means for limiting the operation of said counter to a plurality of consecutive cycles of said potentiometric variations, and governing means responsive to said other magnitude for controlling said limiting means in dependence upon said latter magnitude, whereby said counter during a series of consecutive cycles indicates an integral value representative of the ratio to be determined.

21. A system for determining a measuring value as a function of two control magnitudes, comprising an arrangement formed of a measuring network, control means in said network for varying an electric magnitude of said network in accordance with one of said control magnitudes, variable circuit means also disposed in said network for compensating said electric variation, drive means for actuating said circuit means so as to vary its electrical characteristic in a cycle of variation of given duration, a control relay and an integrating measuring instrument connected with said network for actuating said instrument during a limited period within each of said cycles in dependence upon the phase position, relative to said cycle, where said electric variation is compensated by said circuit means, and a control device responsive to said other control magnitude and connected with said drive means for determining the frequency of recurrence of said cycles in accordance with said other control magnitude.

GEORGE KEINATH.